J. F. CONRAD.
CABLE CONNECTOR.
APPLICATION FILED MAY 15, 1918.

1,316,688. Patented Sept. 23, 1919.

Witness
Inventor
J. F. Conrad
By C. A. Snow & Co.
Attorneys

UNITED STATES PATENT OFFICE.

JOHN F. CONRAD, OF NETTLETON, PENNSYLVANIA.

CABLE-CONNECTOR.

1,316,688.  Specification of Letters Patent.  Patented Sept. 23, 1919.

Application filed May 15, 1918. Serial No. 234,695.

*To all whom it may concern:*

Be it known that I, JOHN F. CONRAD, a citizen of the United States, residing at Nettleton, in the county of Cambria and State of Pennsylvania, have invented a new and useful Cable-Connector, of which the following is a specification.

The subject of this invention is a cable connector which is suitable for connecting the meeting ends of cables or similar elements.

The main object of the invention is the provision of a connector which may be quickly assembled and disassembled.

Another object of the invention is the provision of interengaging elements which may be attached to the ends of cables.

The invention also contemplates generally improving the construction and enhancing the utility of connectors.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1:
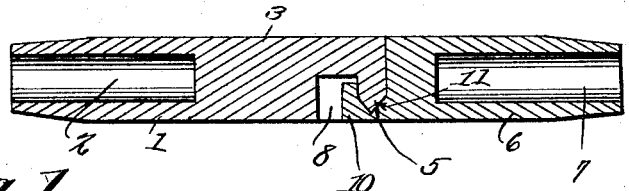
Figure 1 is a view in longitudinal section of the device.
Figure 2:
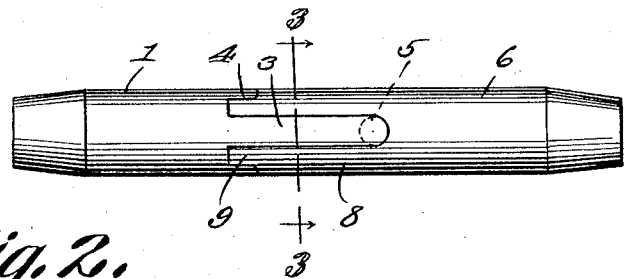
Fig. 2 is a plan view of the same.
Figure 3:
Fig. 3 is a cross section on the line 3—3 of Fig. 2.
Figure 4:
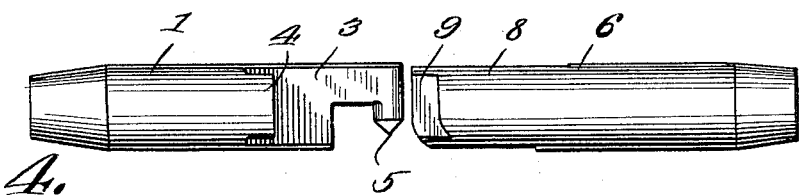
Fig. 4 is a view in side elevation of the device showing the parts separated.
Figure 5:
Fig. 5 is a view in side elevation of the device showing the parts in connected position, the position assumed by the parts when connecting or disconnecting shown in dotted lines.

Referring to the drawing by numerals of reference:—

In carrying out the invention there is provided a substantially cylindrical connector element 1 which has a recess or socket formed in one end thereof, as indicated by the numeral 2, for the reception of the end of a cable or the like, which end may be secured in the socket in any usual and well known manner.

At that end of the member 1 remote from the end in which the socket is provided is formed an attenuated portion 3, the side walls of which converge upwardly, as viewed in the drawing, and fingers or flanges 4 project from this end of the member 1 and these fingers are parallel with and spaced from the portion 3. The attenuated portion 3 is undercut near its outer end to form a depending boss 5.

A supplemental connector member coöperates with the member just described, and this member consists of a cylindrical body 6 formed with a recess or socket 7 in one end thereof for the reception of a cable end or the like. The end of the body 6 remote from the socketed end, is bifurcated to provide the prongs 8 which are adapted, when the connector members are connected, to lie on each side of the attenuated portion 3. The opposed faces of the prongs 8 also converge upwardly to closely contact the sides of the portion 3 when the parts are assembled.

The ends of the prongs 8 are reduced, as indicated by the numeral 9, to enter the grooves formed between the portion 3 and the fingers 4. At the base of the bifurcated portion of the body 6 a bridging wall 10 is formed and this wall is provided with a socket 11 in which the boss 5 is seatable.

As will be evident from a consideration of Fig. 1, tensile stress placed upon the connector will be resisted by the engagement of the boss 5 with the socket 11, and these parts will be maintained in close contact by the weight of the cable or, more properly speaking, by gravity.

Having thus described the invention, what is claimed as new and sought by Letters Patent, is:—

A connector, including supplemental connector members attachable to a cable, one of said members bifurcated longitudinally and having a bridging wall across a portion of the bifurcation, said wall formed with a socket, an attenuated portion extending from the other member and adapted to enter the bifurcation, and a boss on the attenuated portion and seatable in the socket, said bifurcated member fitting upon the attenuated portion of the other member, and fingers on the latter member to interlock with said bifurcated member.

In testimony that I claim the foregoing as my own I have hereto affixed my signature in the presence of two witnesses.

JOHN F. CONRAD.

Witnesses:
 DAN L. PARSONS,
 J. L. HERSHBERGER.

Copies of this patent may be obtained for five cents each, by addressing the "Commissioner of Patents Washington, D. C."